(12) United States Patent
Cho et al.

(10) Patent No.: US 9,546,711 B2
(45) Date of Patent: Jan. 17, 2017

(54) MULTI-STAGE TRANSMISSION FOR VEHICLE

(71) Applicant: Hyundai Motor Company, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/713,228

(22) Filed: May 15, 2015

(65) Prior Publication Data

US 2016/0146300 A1    May 26, 2016

(30) Foreign Application Priority Data

Nov. 26, 2014 (KR) .................. 10-2014-0166841

(51) Int. Cl.
*F16H 3/66*    (2006.01)

(52) U.S. Cl.
CPC ......... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 8,303,455 | B2 | 11/2012 | Gumpoltsberger et al. | |
|---|---|---|---|---|
| 2009/0048059 | A1* | 2/2009 | Phillips | F16H 3/66 475/275 |
| 2015/0031492 | A1* | 1/2015 | Lippert | F16H 3/66 475/275 |
| 2015/0226290 | A1* | 8/2015 | Lippert | F16H 3/66 475/277 |

FOREIGN PATENT DOCUMENTS

| KR | 10-2011-0131816 A | 12/2011 |
|---|---|---|
| KR | 10-2013-0031455 A | 3/2013 |
| KR | 10-2013-0031456 A | 3/2013 |
| KR | 10-2013-0077146 A | 7/2013 |

* cited by examiner

*Primary Examiner* — Erin D Bishop
(74) *Attorney, Agent, or Firm* — Morgan, Lewis & Bockius LLP

(57) ABSTRACT

A multi-stage transmission for a vehicle may include an input shaft and an output shaft, a first planetary gear device, a second planetary gear device, a third planetary gear device, and a fourth planetary gear device provided between the input shaft and the output shaft so as to transfer a torque and each including three rotating elements, and at least six shifting elements connected to the rotating elements of the first to fourth planetary gear devices.

7 Claims, 2 Drawing Sheets

FIG. 2

| SHIFTING POSITION | CL1 | CL2 | CL3 | CL4 | CL5 | CL6 | GEAR RATIO |
|---|---|---|---|---|---|---|---|
| 1ST | | | O | O | | O | 5.947 |
| 2ND | | | O | | O | O | 5.329 |
| 3RD | | | O | O | O | | 3.568 |
| 4TH | | | | O | O | O | 2.623 |
| 5TH | | O | | O | O | | 1.679 |
| 6TH | O | | | O | O | | 1.421 |
| 7TH | O | O | | O | | | 1.116 |
| 8TH | O | O | | | | O | 1.000 |
| 9TH | O | | | O | | O | 0.941 |
| 10TH | | O | | O | | O | 0.630 |
| REV | | O | O | O | | | 3.568 |

MULTI-STAGE TRANSMISSION FOR VEHICLE

CROSS REFERENCE TO RELATED APPLICATION

The present application claims priority to Korean Patent Application No. 10-2014-0166841 filed Nov. 26, 2014, the entire contents of which is incorporated herein for all purposes by this reference.

BACKGROUND OF THE INVENTION

Field of the Invention

The present invention relates to a multi-stage transmission for a vehicle, and more particularly, to a technology capable of improving fuel efficiency of a vehicle by implementing as many shifting stages as possible by as few and as small components as possible and a simple configuration.

Description of Related Art

Recently, a rise in an oil price has become a factor allowing automobile manufacturers throughout the world to enter into unlimited competition toward fuel efficiency improvement, and in the case of an engine, an effort to improve fuel efficiency and decrease a weight through a technology such as downsizing, or the like, has been conducted.

Meanwhile, among methods of improving fuel efficiency that may be made by a transmission mounted in a vehicle, there is a method of allowing an engine to be driven at a more efficient driving point through a multi-stage transmission to ultimately improve fuel efficiency.

In addition, the multi-stage transmission as described above may allow the engine to be driven in a relatively low revolution per minute (RPM) band to further improve silence of the vehicle.

However, as shifting stages of the transmission are increased, the number of internal components forming the transmission is increased, such that a mounting feature and transfer efficiency may be deteriorated and a cost and a weight may be increased. Therefore, in order to maximize a fuel efficiency improving effect through the multi-stage transmission, it is important to devise a transmission structure capable of deriving maximum efficiency by a small number of components and a comparatively simple configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-stage transmission for a vehicle capable of maximizing fuel efficiency improvement of the vehicle through driving at an optimal driving point of an engine and improving silence of the vehicle through more silent driving of the engine by implementing at least forward ten stages and reverse one stage or more by a comparatively small number of components and a simple configuration.

According to various aspects of the present invention, a multi-stage transmission for a vehicle may include an input shaft and an output shaft, a first planetary gear device, a second planetary gear device, a third planetary gear device, and a fourth planetary gear device provided between the input shaft and the output shaft so as to transfer a torque and each including three rotating elements, and at least six shifting elements connected to the rotating elements of the first to fourth planetary gear devices, in which a first rotating element of the first planetary gear device may be continuously connected to a third rotating element of the second planetary gear device, a second rotating element of the first planetary gear device may be continuously connected to a second rotating element of the third planetary gear device and a third rotating element of the fourth planetary gear device, and a third rotating element of the first planetary gear device may be selectively connected to a second rotating element of the second planetary gear device and may be fixably installed by any one of the shifting elements, a first rotating element of the second planetary gear device may be selectively connected to a first rotating element of the fourth planetary gear device and may be fixably installed by another of the shifting elements, the second rotating element of the second planetary gear device may be continuously connected to the input shaft, and the third rotating element of the second planetary gear device may be continuously connected to a first rotating element of the third planetary gear device, a third rotating element of the third planetary gear device may be selectively connected to the first rotating element and a second rotating element of the fourth planetary gear device, and the second rotating element of the fourth planetary gear device may be continuously connected to the output shaft.

The first planetary gear device, the second planetary gear device, the third planetary gear device, and the fourth planetary gear device may be sequentially disposed in an axial direction of the input shaft and the output shaft.

The third rotating element of the first planetary gear device may be fixably installed to a transmission case by a third clutch among the shifting elements, the first rotating element of the second planetary gear device may be fixably installed to the transmission case by a fourth clutch among the shifting elements, and the remaining shifting elements may be configured to form selective connection structures between the rotating elements of the planetary gear devices.

A first clutch among the shifting elements may form the selective connection structure between the third rotating element of the first planetary gear device and the second rotating element of the second planetary gear device, a second clutch among the shifting elements may form the selective connection structure between the third rotating element of the third planetary gear device and the second rotating element of the fourth planetary gear device, a fifth clutch among the shifting elements may form the selective connection structure between the first rotating element of the second planetary gear device and the first rotating element of the fourth planetary gear device, and a sixth clutch among the shifting elements may form the selective connection structure between the third rotating element of the third planetary gear device and the first rotating element of the fourth planetary gear device.

According to various aspects of the present invention, a multi-stage transmission for a vehicle may include a first planetary gear device, a second planetary gear device, a third planetary gear device, and a fourth planetary gear device each having three rotating elements, six shifting elements configured so as to selectively provide frictional force, and eight shafts connected to the rotating elements of the planetary gear devices, in which a first shaft may be an input shaft connected in series with a second rotating element of the second planetary gear device, a second shaft may be connected in series with a third rotating element of the first planetary gear device, a third shaft may be connected in series with a first rotating element of the first planetary gear device, a third rotating element of the second planetary gear device, and a first rotating element of the third planetary gear device, a fourth shaft may be connected in series with a second rotating element of the first planetary gear device, a second rotating element of the third planetary gear device, and a third rotating element of the fourth planetary gear device, a fifth shaft may be connected in series with a first rotating element of the second planetary gear device; a sixth shaft may be connected in series with a third rotating element of the third planetary gear device, a seventh shaft may be connected in series with a first rotating element of the fourth planetary gear device, and an eighth shaft may be an output shaft connected in series with a second rotating element of the fourth planetary gear device, and in which a first clutch among the six shifting elements may be installed between the first shaft and the second shaft, a second clutch among the six shifting elements may be installed between the sixth shaft and the eighth shaft, a third clutch among the six shifting elements may be installed between the second shaft and a transmission case, a fourth clutch among the six shifting elements may be installed between the fifth shaft and the transmission case, a fifth clutch among the six shifting elements may be installed between the fifth shaft and the seventh shaft, and a sixth clutch among the six shifting elements may be installed between the sixth shaft and the seventh shaft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation modes of the exemplary multi-stage transmission for the vehicle of FIG. 1.

Figure 1:
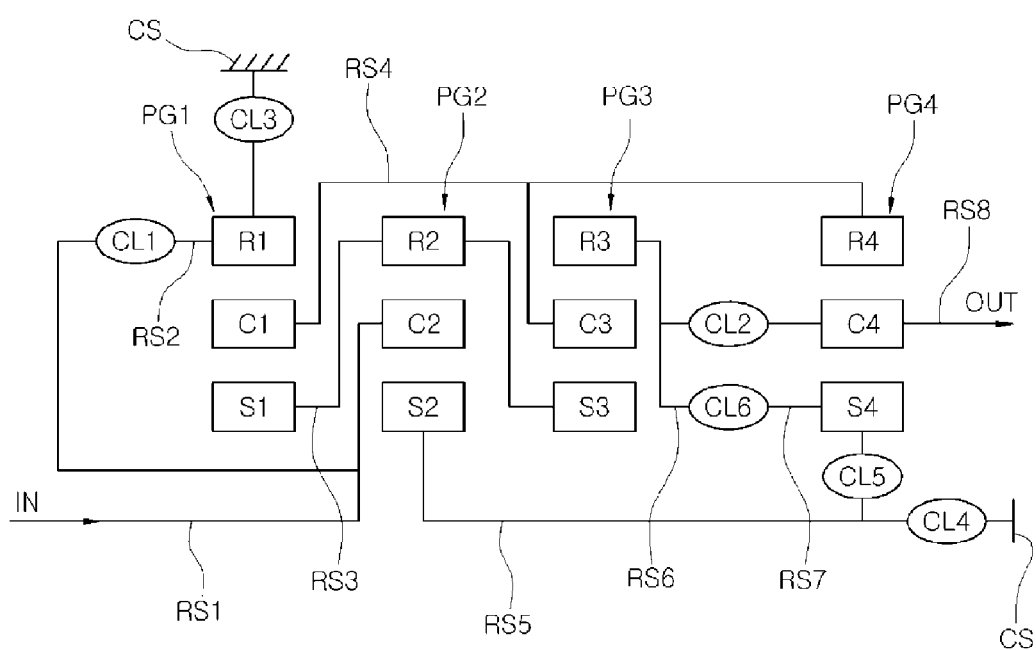
FIG. 1 is a diagram showing an exemplary a multi-stage transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 and FIG. 2, a multi-stage transmission for a vehicle according to various embodiments of the present invention is configured to include an input shaft IN and an output shaft OUT, a first planetary gear device PG1, a second planetary gear device PG2, a third planetary gear device PG3, and a fourth planetary gear device PG4 provided between the input shaft IN and the output shaft OUT so as to transfer a torque and each including three rotating elements; and at least six shifting elements connected to the rotating elements of the first to fourth planetary gear devices.

A first rotating element S1 of the first planetary gear device PG1 is continuously connected to a third rotating element R2 of the second planetary gear device PG2, a second rotating element C1 thereof is continuously connected to a second rotating element C3 of the third planetary gear device PG3 and a third rotating element R4 of the fourth planetary gear device PG4, and a third rotating element R1 thereof is selectively connected to the second rotating element C2 of the second planetary gear device PG2 and is fixably installed by any one of the shifting elements.

A first rotating element S2 of the second planetary gear device PG2 is selectively connected to a first rotating element S4 of the fourth planetary gear device PG4 and is fixably installed by another of the shifting elements, the second rotating element C2 thereof is continuously connected to the input shaft IN, and the third rotating element R2 thereof is continuously connected to a first rotating element S3 of the third planetary gear device PG3.

A rotating element R3 of the third planetary gear device PG3 is selectively connected to the first rotating element S4 and a second rotating element C4 of the fourth planetary gear device PG4, and the second rotating element C4 of the fourth planetary gear device PG4 is continuously connected to the output shaft OUT.

The first planetary gear device PG1, the second planetary gear device PG2, the third planetary gear device PG3, and the fourth planetary gear device PG4 are sequentially disposed in an axial direction of the input shaft IN and the output shaft OUT.

The third rotating element R1 of the first planetary gear device PG1 is fixably installed to a transmission case CS by a third clutch CL3 among the shifting elements; and the first rotating element S2 of the second planetary gear device PG2 is fixably installed to the transmission case CS by a fourth clutch CL4 among the shifting elements.

Therefore, the third clutch CL3 and the fourth clutch CL4 serve as brakes, respectively, to serve to restrict or allow rotation of the third rotating element R1 of the first planetary gear device PG1 and the first rotating element S2 of the second planetary gear device PG2, respectively.

The others among the shifting elements are configured so as to form selective connection structures between the rotating elements of the planetary gear devices.

That is, a first clutch CL1 among the shifting elements forms the selective connection structure between the third rotating element R1 of the first planetary gear device PG1 and the second rotating element C2 of the second planetary gear device PG2; a second clutch CL2 among the shifting elements forms the selective connection structure between the third rotating element R3 of the third planetary gear device PG3 and the second rotating element C4 of the fourth planetary gear device PG4; a fifth clutch CL5 among the shifting elements forms the selective connection structure between the first rotating element S2 of the second planetary gear device PG2 and the first rotating element S4 of the fourth planetary gear device PG4; and a sixth clutch CL6 among the shifting elements forms the selective connection structure between the third rotating element R3 of the third planetary gear device PG3 and the first rotating element S4 of the fourth planetary gear device PG4.

In the present exemplary embodiment, the first rotating element S1, the second rotating element C1, and the third rotating element R1 of the first planetary gear device PG1 are a first sun gear, a first carrier, and a first ring gear, respectively, the first rotating element S2, the second rotating element C2, and the third rotating element R2 of the second planetary gear device PG2 are a second sun gear, a second carrier, and a second ring gear, respectively, the first rotating element S3, the second rotating element C3, and the third rotating element R3 of the third planetary gear device PG3 are a third sun gear, a third carrier, and a third ring gear, respectively, and the first rotating element S4, the second rotating element C4, and the third rotating element R4 of the fourth planetary gear device PG4 are a fourth sun gear, a fourth carrier, and a fourth ring gear, respectively.

The multi-stage transmission for a vehicle configured as described above may also be represented as follows.

That is, the multi-stage transmission for a vehicle according to various embodiments of the present invention is configured to include the first planetary gear device PG1, the second planetary gear device PG2, the third planetary gear device PG3, and the fourth planetary gear device PG4 each having three rotating elements, the six shifting elements configured so as to selectively provide frictional force, and eight shafts connected to the rotating elements of the planetary gear devices.

Here, a first shaft RS1 is the input shaft IN connected in series with the second rotating element C2 of the second planetary gear device PG2, a second shaft RS2 is connected in series with the third rotating element R1 of the first planetary gear device PG1, a third shaft RS3 is connected in series with the first rotating element S1 of the first planetary gear device PG1, the third rotating element R2 of the second planetary gear device PG2, and the first rotating element S3 of the third planetary gear device PG3, a fourth shaft RS4 is connected in series with the second rotating element C1 of the first planetary gear device PG1, the second rotating element C3 of the third planetary gear device PG3, and the third rotating element R4 of the fourth planetary gear device PG4, a fifth shaft RS5 is connected in series with the first rotating element S2 of the second planetary gear device PG2, a sixth shaft RS6 is connected in series with the third rotating element R3 of the third planetary gear device PG3, a seventh shaft RS7 is connected in series with the first rotating element S4 of the fourth planetary gear device PG4, and an eighth shaft RS8 is the output shaft OUT connected in series with the second rotating element C4 of the fourth planetary gear device PG4.

In addition, the first clutch CL1 among the six shifting elements is installed between the first shaft RS1 and the second shaft RS2, the second clutch CL2 among the six shifting elements is installed between the sixth shaft RS6 and the eighth shaft RS8, the third clutch CL3 among the six shifting elements is installed between the second shaft RS2 and the transmission case CS, the fourth clutch CL4 among the six shifting elements is installed between the fifth shaft RS5 and the transmission case CS, the fifth clutch CL5 among the six shifting elements is installed between the fifth shaft RS5 and the seventh shaft RS7, and the sixth clutch CL6 among the six shifting elements is installed between the sixth shaft RS6 and the seventh shaft RS7.

Since the multi-stage transmission for a vehicle according to various embodiments of the present invention including the four simple planetary gear devices and the six shifting elements as described above may implement ten forward stages and one reverse stage depending on an operation mode table as shown in FIG. 2, it may implement a multi-stage shifting stage of eleven stages by a relatively small number of components and a simple configuration to contribute to improvement of fuel efficiency and silence of the vehicle, thereby making it possible to improve salability of the vehicle.

As set forth above, according to various embodiments of the present invention, at least forward ten stages and reverse one stage or more are implemented by a comparatively small number of components and a simple configuration, thereby making it possible to maximize fuel efficiency improvement of the vehicle through driving at an optimal driving point of an engine and improve silence of the vehicle through more silent driving of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.,

What is claimed is:

1. A multi-stage transmission for a vehicle, comprising:
an input shaft and an output shaft;
a first planetary gear device, a second planetary gear device, a third planetary gear device, and a fourth planetary gear device provided between the input shaft and the output shaft so as to transfer a torque; and
at least six clutches connected to the first to fourth planetary gear devices,
wherein a first rotating element of the first planetary gear device is directly connected to a third rotating element of the second planetary gear device, a second rotating element of the first planetary gear device is directly connected to a second rotating element of the third planetary gear device and a third rotating element of the fourth planetary gear device, and a third rotating element of the first planetary gear device is selectively connected to a second rotating element of the second planetary gear device by one of the clutches,
a first rotating element of the second planetary gear device is selectively connected to a first rotating element of the fourth planetary gear device by another of the clutches, the second rotating element of the second planetary gear device is directly connected to the input shaft, and the third rotating element of the second planetary gear device is directly connected to a first rotating element of the third planetary gear device, a third rotating element of the third planetary gear device is selectively connected to the first rotating element and a second rotating element of the fourth planetary gear device, and the second rotating element of the fourth planetary gear device is directly connected to the output shaft.

2. The multi-stage transmission for the vehicle of claim 1, wherein the first planetary gear device, the second planetary gear device, the third planetary gear device, and the fourth planetary gear device are sequentially disposed in an axial direction of the input shaft and the output shaft.

3. The multi-stage transmission for the vehicle of claim 2, wherein the third rotating element of the first planetary gear device is fixably installed to a transmission case by a first clutch among the clutches, the first rotating element of the second planetary gear device is fixably installed to the transmission case by a second clutch among the clutches, and remaining clutches among the clutches are configured to form selective connection structures between the rotating elements of the planetary gear devices.

4. The multi-stage transmission for the vehicle of claim 3, wherein the one of the clutches is a third clutch among the clutches forming the selective connection structure between the third rotating element of the first planetary gear device and the second rotating element of the second planetary gear device, a fourth clutch among the clutches forms the selective connection structure between the third rotating element of the third planetary gear device and the second rotating element of the fourth planetary gear device, a fifth clutch among the clutches forms the selective connection structure between the first rotating element of the second planetary gear device and the first rotating element of the fourth planetary gear device, wherein the fifth clutch is the another of the clutches, and a sixth clutch among the clutches forms the selective connection structure between the third rotating element of the third planetary gear device and the first rotating element of the fourth planetary gear device.

5. A multi-stage transmission for a vehicle, comprising:
a first planetary gear device, a second planetary gear device, a third planetary gear device, and a fourth planetary gear device; and
six clutches configured to selectively provide frictional force,
wherein a first shaft is an input shaft directly connected to a second rotating element of the second planetary gear device,
a second shaft is directly connected to a third rotating element of the first planetary gear device,
a third shaft is directly connected to a first rotating element of the first planetary gear device, a third rotating element of the second planetary gear device, and a first rotating element of the third planetary gear device,
a fourth shaft is directly connected a second rotating element of the first planetary gear device, a second rotating element of the third planetary gear device, and a third rotating element of the fourth planetary gear device,
a fifth shaft is directly connected to a first rotating element of the second planetary gear device,
a sixth shaft is directly connected to a third rotating element of the third planetary gear device,
a seventh shaft is directly connected to a first rotating element of the fourth planetary gear device, and
an eighth shaft is an output shaft directly connected to a second rotating element of the fourth planetary gear device,
wherein a first clutch among the six clutches is installed between the first shaft and the second shaft, a second clutch among the six clutches is installed between the sixth shaft and the eighth shaft, a third clutch among the six clutches is installed between the second shaft and a transmission case, a fourth clutch among the six clutches is installed between the fifth shaft and the transmission case, a fifth clutch among the six clutches is installed between the fifth shaft and the seventh shaft, and a sixth clutch among the six clutches is installed between the sixth shaft and the seventh shaft.

6. The multi-stage transmission for the vehicle of claim 5, wherein the first planetary gear device, the second planetary gear device, the third planetary gear device, and the fourth planetary gear device are sequentially disposed in an axial direction of the input shaft and the output shaft.

7. The multi-stage transmission for the vehicle of claim 5, wherein the first clutch is installed to selectively connect the third rotating element of the first planetary gear device and the second rotating element of the second planetary gear device, the second clutch is installed to selectively connect the third rotating element of the third planetary gear device and the second rotating element of the fourth planetary gear device, the fifth clutch is installed to selectively connect the first rotating element of the second planetary gear device and the first rotating element of the fourth planetary gear device, and the sixth clutch is installed to selectively connect the third rotating element of the third planetary gear device and the first rotating element of the fourth planetary gear device.

* * * * *